2,739,157

RACEMIZATION OF α-HYDROXY-β,β-DIMETHYL-GAMMA-BUTYROLACTONE

Philip D. Hammond, Westfield, N. J., assignor to Merck & Co., Inc., Rahway, N. J., a corporation of New Jersey No Drawing. Application July 8, 1952,
Serial No. 297,756

11 Claims. (Cl. 260—343.6)

This invention is concerned generally with the preparation of pantothenic acid. More particularly, it relates to an improved procedure for racemizing the dextrorotatory isomer of α-hydroxy-β,β-dimethyl-γ-butyrolactone to produce the racemic mixture, dl-α-hydroxy-β,β-dimethyl-γ-butyrolactone.

Physiologically active pantothenic acid, the dextrorotatory form, is ordinarily prepared by condensing β-alanine or derivatives thereof with the laevorotatory isomer of α-hydroxy-β,β-dimethyl-γ-butyrolactone; condensation of the β-alanine compound with the dextrorotatory isomer of α-hydroxy-β,β-dimethyl-γ-butyrolactone results in the formation of the physiologically inactive laevorotatory pantothenic acid. The α-hydroxy-β,β-dimethyl-γ-butyrolactone intermediate in the commercial manufacture of pantothenic acid is usually prepared by a synthetic process which results in the formation of the racemic mixture, dl-α-hydroxy-β,β-dimethyl-γ-butyrolactone. This racemate is resolved in accordance with known methods to give the laevorotatory isomer precursor of the physiologically active d-pantothenic acid, together with an equal amount of the dextrorotatory isomer. The economic manufacture of d-pantothenic acid has for many years necessitated the conversion of this d-α-hydroxy-β,β-dimethyl-γ-butyrolactone to the corresponding racemate, dl-α-hydroxy-β,β-dimethyl-γ-butyrolactone which is, in turn, resolved to afford additional amounts of the laevorotatory α-hydroxy-β,β-dimethyl-γ-butyrolactone.

Heretofore, the racemization of d-α-hydroxy-β,β-dimethyl-γ-butyrolactone has been accomplished by heating the dextrorotatory isomer with at least 50% its weight of an alkali metal carbonate or alkaline earth metal hydroxide for a period of at least 12 hours. This prior art procedure has various undesirable features, in particular the long reaction period, and the large amount of alkaline material required to effect racemization. The extraction of the dl-α-hydroxy-β,β-dimethyl-γ-butyrolactone from the large amount of alkaline material used for the racemization has been extremely tedious. Moreover, although the alkali metal carbonates used in this prior method were reported to be anhydrous, such substances are ordinarily considered to be anhydrous even when they contain as much as 1% of water. When the amount of alkali metal carbonate (containing 1% water) is equal to 50% of the weight of the lactone, I have found that, under such conditions, sufficient water is present to split the lactone ring with the formation of an alkali metal salt of d-α-γ-dihydroxy-β,β-dimethylbutyric acid, which salt is very slowly racemized. It is believed that the long reaction time of 12 hours, or more, was thus inherently caused by the large amount of alkaline material heretofore considered essential in this racemization reaction. In addition, where hydrolysis of the lactone occurs during the racemization procedure, the racemic product obtained is a salt of dl-α-γ-dihydroxy-β,β-dimethylbutyric acid, and this salt must be reconverted to the lactone prior to the subsequent resolution and β-alanine condensation operations. The racemization of d-α-hydroxy-β,β-dimethyl-γ-butyrolactone has also been accomplished previously by reacting the dextrorotatory isomer with sodium alcoholate, but this procedure, which necessitates the employment of large amounts of metallic sodium, is expensive and hazardous for commercial operation.

I have now discovered that, contrary to what might have been expected from the prior art teachings, the dextrorotatory isomer of α-hydroxy-β,β-dimethyl-γ-butyrolactone can be converted to the racemic mixture, dl-α-hydroxy-β,β-dimethyl-γ-butyrolactone, by heating said dextrorotatory isomer with merely a catalytic amount of an alkali metal carbonate. Under these reaction conditions the racemization reaction is substantially complete after a reaction period of less than about 4 hours; moreover, in view of the small amount of alkaline material utilized, no hydrolysis of the lactone occurs and the dl-α-hydroxy-β,β-dimethyl-γ-butyrolactone is thus obtained in a form substantially free of any of the corresponding alkali metal salts of dl-α-γ-dihydroxy-β,β-dimethylbutyric acid. The dl-α-hydroxy-β,β-dimethyl-γ-butyrolactone can therefore be fractionally distilled directly from the racemization mixture in a form ready for the resolution operation. The yield of dl-α-hydroxy-β,β-dimethyl-γ-butyrolactone, obtained in accordance with my improved procedure, based on the d-α-hydroxy-β,β-dimethyl-γ-butyrolactone starting material, is over 95% of that theoretically obtainable.

In accordance with this invention, I utilize, as starting material, d-α-hydroxy-β,β-dimethyl-γ-butyrolactone which contains less than 0.50% water and, as the racemization agent, an alkali metal carbonate containing less than 1.0% water and in an amount within the range of 2 to 5% by weight of the d-α-hydroxy-β,β-dimethyl-butyrolactone. By thus utilizing reactants which are practically free of even the slightest traces of water, and by employing merely a catalytic amount of alkali metal carbonate, the total amount of water present in the reaction mixture is reduced to less than 0.55% of the weight of the d-α-hydroxy-β,β-dimethyl-γ-butyrolactone. I have found that, when d-α-hydroxy-β,β-dimethyl-γ-butyrolactone containing less than 0.50% water is heated with 2 to 5% its weight of an alkali metal carbonate containing less than 1.0% water at a temperature within the range 125–130° C., the racemization of the d-α-hydroxy-β,β-dimethyl-γ-butyrolactone to form dl-α-hydroxy-β,β-dimethyl-γ-butyrolactone is substantially complete after a heating period of about 3 to 4 hours. A further advantage of my process is that the racemic α-hydroxy-β,β-dimethyl-γ-butyrolactone is readily recovered directly from the racemization mixture by subjecting said mixture to distillation in vacuo.

The d-α-hydroxy-β,β-dimethyl-γ-butyrolactone, containing less than 0.50% water, utilized as starting material, is ordinarily prepared starting with the mother liquors remaining after the resolution of dl-α-hydroxy-β,β-dimethyl-γ-butyrolactone obtained in accordance with known synthetic methods. The d-α-hydroxy-β,β-dimethyl-γ-butyrolactone is conveniently isolated from such mother liquors by acidifying to a pH of about 1 with aqueous hydrochloric acid, partially evaporating the solvent under reduced pressure, and subjecting the residual material to azeotropic distillation in vacuo until the water content of the d-α-hydroxy-β,β-dimethyl-γ-butyrolactone is below 0.50%. It is an essential requisite of my invention that, in order to achieve a complete racemization with catalytic amounts of alkali metal carbonates in a minimum reaction time, the d-α-hydroxy-β,β-dimethyl-γ-butyrolactone contain less than about 0.50% water, and I ordinarily prefer to utilize d-α-hydroxy-β,β-dimethyl-γ-butyrolactone having a water content of approximately 0.35%.

Moreover, in my process where merely a catalytic amount of racemizing agent is utilized, I have found that it is essential to employ an alkali metal carbonate since other alkaline materials, such as alkali metal hydroxides, alkaline earth metal hydroxides, and alkaline earth metal carbonates are not suitable for my process. Although I can employ any alkali metal carbonate, such as sodium carbonate, potassium carbonate, lithium carbonate, rubidium carbonate, and the like, I prefer to utilize sodium carbonate since this material is inexpensive and readily available, and may be easily obtained in the form of material having a water content below 1%.

I have found that the racemization reaction can be conducted utilizing an amount of alkali metal carbonate equal to about 2 to 5% by weight of the $d$-$\alpha$-hydroxy-$\beta,\beta$-dimethyl-$\gamma$-butyrolactone. I prefer to use an amount of alkali metal carbonate equal to about 4% by weight of the dextrorotatory lactone. As pointed out hereinabove, I have found that, when the weight of alkali metal carbonate used is in excess of 5% of the weight of the $d$-lactone, sufficient water is thereby introduced into the reaction mixture so that the splitting of the lactone ring and formation of the undesirable alkali metal salts of $\alpha$-hydroxy-$\beta,\beta$-dimethyl-$\gamma$-butyric acid can result. In addition, where larger amounts of alkali metal carbonate are used, the alkali metal carbonate occludes some of the racemic lactone produced by the racemization reaction and thereby prevents its recovery by direct distillation.

The recovery of the $dl$-$\alpha$-hydroxy-$\beta,\beta$-dimethyl-$\gamma$-butyrolactone from the racemization mixture is accomplished, as previously pointed out, by a direct distillation of the racemization mixture in vacuo. This distillation is conveniently conducted at a pressure of 1 to 7 mm., under which conditions the $dl$-$\alpha$-hydroxy-$\beta,\beta$-dimethyl-$\gamma$-butyrolactone distills within the temperature range 90–115° C.

The following example illustrates a method of carrying out the present invention. It is to be understood that this example is given for purposes of illustration and not of limitation.

*Example 1*

One hundred and thirty-seven and three-tenths grams of $d$-$\alpha$-hydroxy-$\beta,\beta$-dimethyl-$\gamma$-butyrolactone, having a water content of 0.35%, and 5.49 g. of anhydrous sodium carbonate (containing less than 1% of water) were mixed together, and the mixture was heated, with stirring, at a temperature of 125–130° C. for a period of 4 hours. The resulting mixture was distilled in vacuo at a pressure of 1.0 mm.; the fraction distilling at a temperature of 90–95° C. was collected and found to be substantially pure $dl$-$\alpha$-hydroxy-$\beta,\beta$-dimethyl-$\gamma$-butyrolactone. The temperature of the distilland was then raised to 150° C. and maintained at that temperature until distillation ceased; the material distilling under these conditions was collected and likewise found to be substantially pure $dl$-$\alpha$-hydroxy-$\beta,\beta$-dimethyl-$\gamma$-butyrolactone. The total amount of $dl$-$\alpha$-hydroxy-$\beta,\beta$-dimethyl-$\gamma$-butyrolactone recovered was approximately 95.9% of that theoretically obtainable based upon the $d$-$\alpha$-hydroxy-$\beta,\beta$-dimethyl-$\gamma$-butyrolactone.

The substantially anhydrous $d$-$\alpha$-hydroxy-$\beta,\beta$-dimethyl-$\gamma$-butyrolactone, utilized as starting material in the foregoing example, was prepared as follows: Thirty milliliters of water were added to 1500 ml. of the chloroform mother liquor containing $d$-$\alpha$-hydroxy-$\beta,\beta$-dimethyl-$\gamma$-butyrolactone (obtained from the resolution of the racemic lactone). Twelve and five-tenths grams of sodium bicarbonate was then added, with stirring, over a thirty-minute period, to the aqueous chloroform mixture until the pH of the solution was 7.0. The resulting mixture of chloroform and aqueous phase was evaporated at atmospheric pressure until the temperature of the distilland reached 90° C. The residual material was then evaporated in vacuo at a pressure of 25 mm. until the temperature of the distilland reached 100° C., molten $d$-$\alpha$-hydroxy-$\beta,\beta$-dimethyl-$\gamma$-butyrolactone thus obtained was maintained at that temperature until its water content was reduced to 0.35%.

Various changes and modifications may be made in carrying out the present invention without departing from the spirit and scope thereof. Insofar as these changes and modifications are within the purview of the annexed claims, they are to be considered as part of my invention.

I claim:

1. The process which comprises heating 100 parts by weight of the dextrorotatory isomer of $\alpha$-hydroxy-$\beta,\beta$-dimethyl-$\gamma$-butyrolactone containing less than 0.5% of water with approximately 2 to 5 parts by weight of a substantially anhydrous alkali metal carbonate containing less than about 1% water, for a period of less than about four hours, thereby racemizing said dextrorotatory isomer to produce at least about 95 parts by weight of $dl$-$\alpha$-hydroxy-$\beta,\beta$-dimethyl-$\gamma$-butyrolactone.

2. The process which comprises mixing together 100 parts by weight of $d$-$\alpha$-hydroxy-$\beta,\beta$-dimethyl-$\gamma$-butyrolactone and 2 to 5 parts by weight of an alkali metal carbonate, the total amount of water in the mixture being less than about 0.55% of the weight of the $d$-$\alpha$-hydroxy-$\beta,\beta$-dimethyl-$\gamma$-butyrolactone, and heating said mixture at a temperature of about 125–130° C. for a period of about 3 to 4 hours, thereby racemizing said $d$-$\alpha$-hydroxy-$\beta,\beta$-dimethyl-$\gamma$-butyrolactone to produce at least about 95 parts by weight of $dl$-$\alpha$-hydroxy-$\beta,\beta$-dimethyl-$\gamma$-butyrolactone.

3. The process which comprises heating 100 parts by weight of the dextrorotatory isomer of $\alpha$-hydroxy-$\beta,\beta$-dimethyl-$\gamma$-butyrolactone containing less than about 0.5% of water with approximately 2 to 5 parts by weight of a substantially anhydrous alkali metal carbonate containing less than about 1% water, for a period of less than about four hours, thereby racemizing said dextrorotatory isomer to produce $dl$-$\alpha$-hydroxy-$\beta,\beta$-dimethyl-$\gamma$-butyrolactone, and subjecting the reaction mixture, without further treatment, to distillation in vacuo, thereby recovering substantially all of the said $dl$-$\alpha$-hydroxy-$\beta,\beta$-dimethyl-$\gamma$-butyrolactone.

4. The process which comprises mixing together 100 parts by weight of $d$-$\alpha$-hydroxy-$\beta,\beta$-dimethyl-$\gamma$-butyrolactone and 2 to 5 parts by weight of an alkali metal carbonate, the total amount of water in the mixture being less than about 0.55% of the weight of the $d$-$\alpha$-hydroxy-$\beta,\beta$-dimethyl-$\gamma$-butyrolactone, and heating said mixture at a temperature of about 125–130° C. for a period of about 3 to 4 hours, thereby racemizing said $d$-$\alpha$-hydroxy-$\beta,\beta$-dimethyl-$\gamma$-butyrolactone to produce $dl$-$\alpha$-hydroxy-$\beta,\beta$-dimethyl-$\gamma$-butyrolactone, and subjecting the reaction mixture, without further treatment, to distillation in vacuo, thereby recovering substantially all of the said $dl$-$\alpha$-hydroxy-$\beta,\beta$-dimethyl-$\gamma$-butyrolactone.

5. The process which comprises mixing together 100 parts by weight of $d$-$\alpha$-hydroxy-$\beta,\beta$-dimethyl-$\gamma$-butyrolactone and 2 to 5 parts by weight of sodium carbonate, the total amount of water in the mixture being less than about 0.55% of the weight of the $d$-$\alpha$-hydroxy-$\beta,\beta$-dimethyl-$\gamma$-butyrolactone, and heating said mixture at a temperature of about 125–130° C. for a period of about 3 to 4 hours, thereby racemizing said $d$-$\alpha$-hydroxy-$\beta,\beta$-dimethyl-$\gamma$-butyrolactone to produce at least about 95 parts by weight of $dl$-$\alpha$-hydroxy-$\beta,\beta$-dimethyl-$\gamma$-butyrolactone.

6. The process which comprises heating 100 parts by weight of the dextrorotatory isomer of $\alpha$-hydroxy-$\beta,\beta$-dimethyl-$\gamma$-butyrolactone containing less than about 0.5% of water with approximately 2 to 5 parts by weight of substantially anhydrous sodium carbonate containing less than about 1% water, for a period of less than about four hours thereby racemizing said dextrorotatory isomer to produce $dl$-$\alpha$-hydroxy-$\beta,\beta$-dimethyl-$\gamma$-butyrolactone, and subjecting the reaction mixture, without further treatment, to distillation in vacuo, thereby recovering substantially all of the said $dl$-$\alpha$-hydroxy-$\beta,\beta$-dimethyl-$\gamma$-butyrolactone.

7. The process which comprises mixing together 100 parts by weight of $d$-α-hydroxy-β,β-dimethyl-γ-butyrolactone and 2 to 5 parts by weight of sodium carbonate, the total amount of water in the mixture being less than about 0.55% of the weight of the $d$-α-hydroxy-β,β-dimethyl-γ-butyrolactone, and heating said mixture at a temperature of about 125–130° C. for a period of about 3 to 4 hours, thereby racemizing said $d$-α-hydroxy-β,β-dimethyl-γ-butyrolactone to produce $dl$-α-hydroxy-β,β-dimethyl-γ-butyrolactone, and subjecting the reaction mixture, without further treatment, to distillation in vacuo, thereby recovering substantially all of the said $dl$-α-hydroxy-β,β-dimethyl-γ-butyrolactone.

8. The process which comprises mixing together 100 parts by weight of $d$-α-hydroxy-β,β-dimethyl-γ-butyrolactone and 2 to 5 parts by weight of potassium carbonate, the total amount of water in the mixture being less than about 0.55% of the weight of the $d$-α-hydroxy-β,β-dimethyl-γ-butyrolactone, and heating said mixture at a temperature of about 125–130° C. for a period of about 3 to 4 hours, thereby racemizing said $d$-α-hydroxy-β,β-dimethyl-γ-butyrolactone to produce at least about 95 parts by weight of $dl$-α-hydroxy-β,β-dimethyl-γ-butyrolactone.

9. The process which comprises heating 100 parts by weight of the dextrorotatory isomer of α-hydroxy-β,β-dimethyl-gamma-butyrolactone containing less than 0.5% of water with approximately 2 to 5 parts by weight of a substantially anhydrous alkali metal carbonate containing less than about 1% water, for a period of less than about four hours thereby racemizing said dextrorotatory isomer to produce in approximately quantitative yield $dl$-α-hydroxy-β,β-dimethyl-gamma-butyrolactone.

10. The process which comprises mixing together 100 parts by weight of $d$-α-hydroxy-β,β-dimethyl-gamma-butyrolactone and 2 to 5 parts by weight of an alkali metal carbonate, the total amount of water in the mixture being less than about 0.55% of the weight of the $d$-α-hydroxy-β,β-dimethyl-gamma-butyrolactone, and heating said mixture at a temperature of about 125–130° C. for a period of less than about 4 hours, thereby racemizing said $d$-α-hydroxy-β,β,-dimethyl-gamma-butyrolactone to produce at least about 95 parts by weight of $dl$-α-hydroxy-β,β-dimethyl-gamma-butyrolactone.

11. The process which comprises mixing together 100 parts by weight of $d$-α-hydroxy-β,β-dimethyl-gamma-butyrolactone and 2 to 5 parts by weight of an alkali metal carbonate, the total amount of water in the mixture being less than about 0.55% of the weight of the $d$-α-hydroxy-β,β-dimethyl-gamma-butyrolactone, and heating said mixture for a period of about 3 to 4 hours, thereby racemizing said $d$-α-hydroxy-β,β-dimethyl-gamma-butyrolactone to produce at least about 95 parts by weight of $dl$-α-hydroxy-β,β-dimethyl-gamma-butyrolactone.

References Cited in the file of this patent

UNITED STATES PATENTS

| | | |
|---|---|---|
| 2,377,390 | Weijlard | June 5, 1945 |
| 2,434,061 | Weijlard | Jan. 6, 1949 |

OTHER REFERENCES

Cohen: Org. Chem., 4th ed., part II, page 195, Longmans, Green and Co., New York (1923).

Houben: Die Methoden der Organ. Chem., vol. 2, 3rd ed., G. Thieme, Leipzig (1925), pp. 1100–07.

Gilman: Org. Chem., vol. 1, pp. 179–80, John Wiley and Sons, New York (1938).